(12) United States Patent
Miyake et al.

(10) Patent No.: US 6,599,027 B2
(45) Date of Patent: Jul. 29, 2003

(54) FERRULE HOLDING STRUCTURE FOR OPTICAL CONNECTOR COMPONENT

(75) Inventors: Yukinori Miyake, Tokyo (JP); Takumi Yoshida, Tokyo (JP); Shin Sumida, Musashino (JP); Shuichi Yanagi, Musashino (JP)

(73) Assignees: Hirose Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/086,593

(22) Filed: Mar. 1, 2002

(65) Prior Publication Data

US 2002/0122634 A1 Sep. 5, 2002

(30) Foreign Application Priority Data

Mar. 2, 2001 (JP) .................................... 2001-058285

(51) Int. Cl.[7] ................................................ G02B 6/36
(52) U.S. Cl. ............................ 385/78; 385/81; 385/56
(58) Field of Search ......................... 385/60–68, 70–73, 385/78–85, 55, 56

(56) References Cited

U.S. PATENT DOCUMENTS

| 4,812,006 | A | * | 3/1989 | Osborn et al. ................. 385/78 |
| 5,373,573 | A | | 12/1994 | Welsh .......................... 385/69 |
| 5,394,497 | A | * | 2/1995 | Erdman et al. ................ 385/78 |
| 5,764,834 | A | * | 6/1998 | Hultermans ................ 385/78 X |
| 6,004,041 | A | * | 12/1999 | Kunishi ..................... 385/81 X |
| 6,318,905 | B1 | * | 11/2001 | Valencia et al. .............. 385/78 |

FOREIGN PATENT DOCUMENTS

| EP | 0624810 | 11/1994 |
| EP | 0764859 | 3/1997 |
| EP | 1024379 | 8/2000 |
| JP | 57099605 | 6/1982 |
| JP | 5-45924 | 7/1993 |
| JP | 10039145 | 2/1998 |
| JP | 11160544 | 6/1999 |

* cited by examiner

Primary Examiner—Lynn Feild
Assistant Examiner—Son V. Nguyen
(74) Attorney, Agent, or Firm—Cohen, Pontani, Lieberman & Pavane

(57) ABSTRACT

Disclosed is an optical connector component 31 comprising a ferrule 2 for receiving an end portion of a core optical fiber of a fiber optic cable, a flange 32 mounted on the peripheral of the ferrule 2, and a one-piece plug frame 33 for floatingly supporting the ferrule 2 having the flange 32 mounted thereon. The flange 32 and the plug frame 33 are provided with respective engagement portions 37, 50 that are mutually engaged. The flange 32 has such resiliency that it is reduced in diameter by a radial and inward force exerted through the engagement portions 37, 50 when the ferrule 2 is inserted into the plug frame 33 from one end thereof and the flange 32 is restored to the original condition present before the insertion when the engagement portions 37, 50 are mutually engaged.

6 Claims, 4 Drawing Sheets

FERRULE HOLDING STRUCTURE FOR OPTICAL CONNECTOR COMPONENT

BACKGROUND OF THE INVENTION

1. Field of the Invention

The present invention relates to a ferrule holding structure for an optical connector component for use in connection between fiber optic cables.

2. Description of the Related Art

In general, in an optical communication system, several types of optical connector components have been used for detachably connecting between one fiber optic cable and another fiber optic cable or other optical device. One example of such optical connector components is an optical attenuator that is disclosed in TOKKOHEI No. 5-45924. Such optical attenuator is designed to have optical connectors mounted on both sides thereof so that an optical signal is relayed and attenuated between those optical connectors.

One such conventional type attenuator 1 is illustrated in FIG. 4. Referring to this figure, the optical attenuator 1 includes a ferrule 2 for receiving a core optical fiber at the center thereof, a connection sleeve 3 for an attenuation film 61 affixed to an outer middle portion of the ferrule 2, a split sleeve 4 affixed to an outer rear end portion of the ferrule 2, a first plug frame 5 for surrounding and holding a front end portion of the ferrule 2, a second plug frame 6 for surrounding and holding an opposite rear end portion of the ferrule 2, and a housing member 7 for accommodating the first and second plug frames 5 and 6.

The ferrule 2 is made of some ceramic material such as zirconia and has an axially elongated cylindrical form on which the attenuation film 61 is deposited for attenuating the passage of light.

The connection sleeve 3 is made of some metal material such as copper alloy in the form of a hollow cylinder that is affixed to the ferrule 2 with an adhesive. A flange 8 is affixed on an outer peripheral of the ferrule 2 adjacent a front end of the sleeve 3. The flange 8 is made of metal and has predetermined number of grooves (not shown) formed on an outer surface thereof.

The split sleeve 4 is made of zirconia, for example, in the form of a hollow cylinder and is axially split to provide resiliency. The split sleeve 4 has a front end surface that is contact with the rear end surface of the connection sleeve 3, and an opposite rear end surface that is backwardly projected beyond the rear end surface of the ferrule 2.

The first plug frame 5 is made of some plastic material, for example, and it is generally in the form of a cubic in which a cylindrical cavity 9 is axially formed. An inner brim 10 is formed at the inner center portion of the first plug frame 5 and has keys provided at the rear end portion thereof in corresponding to the grooves in the flange 8. Thereby, the ferrule 2 having the connection sleeve 3 mounted thereon is prevented from falling off the front end of the attenuator 1. A first engagement portion 12 is formed on and projected from an outer surface of the first plug frame 5, and a protrusion 13 is formed on the rear portion of the first engagement portion 12. In addition, latch holes 14 are formed at positions opposite to each other on the rear portion of the first plug frame 5, and elongated cutouts (not shown) are also formed at another positions opposite to each other to extend from the rear end of the first plug frame 5.

The second plug frame 6 is made of some plastic material, for example, and includes, a cylindrical holding portion 16 in axial direction and a pair of thin plate-like resiliently deformable portions 17 that extend in cantilevered manner from the middle portion of the holding portion 16 toward the rear end of the attenuator 1. Each of the deformable portions 17 has its rear end portion inwardly projected to form a second engagement portion 18. The holding portion 16 has its outer surface on which latch projections 19 are formed at the positions corresponding to the latch holes 14, and its inner surface on which a shoulder 20 is formed at the middle portion thereof. The holding portion 16 further includes an inwardly projecting fall-off prevention portion 21 formed on the rear end portion thereof for preventing the ferrule 2 fixed to the split sleeve 4 from falling off the holding portion 16.

The housing member 7 is made of stainless steel, for example, and includes a front end portion 22 that is mated with an adapter (not shown) and a rear end portion 23 with which a plug (not shown) is mated. The front end portion 22 has such width that is smaller than that of the rear end portion 23 so that there is a difference in width produced therebetween. An opening 24 is provided on each of both sidewalls of the front end portion 22. Accordingly the first engagement portion 12 and the protrusion 13 may cause an axial floating movement along the openings 24. In addition, a key projection 25 is formed on an outer surface of the front end portion 22, and the corresponding guide recess 26 is formed in the sidewall of the rear end portion 23 so that it axially extends from the rear end thereof.

Now, the process of assembling the prior art optical attenuator 1 having the configuration as above will be described.

The connection sleeve 3 is affixed to the ferrule 2 with an adhesive. Then, the flange 8 is affixed so that it is contact with the front end surface of the connection sleeve 3. The split sleeve 4 is press-fitted so that it is contact with the rear end surface of the connection sleeve 3. Thereafter, the front end portion of the ferrule 2 having the connection sleeve 3, the split sleeve 4 and the flange 8 mounted thereon is inserted into the cavity 9 of the first plug frame 5 from the rear side thereof In this connection, the groove (not shown) on the flange 8 is mated with the key 11 of the first plug frame 5 so that the flange 8 abuts the brim 10. Then, the second plug frame 6 is inserted into the first plug frame 5 in such manner that the holding portion 16 of the second plug frame 6 surrounds the rear end portion of the split sleeve 4. Thereafter, the second plug frame 6 is further inserted until the latch projection 19 snaps into the latch hole 14 upon which the second plug frame 6 is coupled to the first plug frame 5. In this condition the ferrule 2 may floatingly be moved in the axial direction between the inner brim 10 of the first plug frame 5 and the shoulder 20 of the second plug frame 6. Finally the first and second plug frames 5 and 6 coupled together are inserted into the housing member 7 from the rear side thereof until the first engagement portion 12 and the protrusion 13 become received in the opening 24. Accordingly, the first and second plug frames 5 and 6 are held in the housing member 7, but they may floatingly be moved in the axial direction.

The optical attenuator 1 that is assembled in the manner as above is then connected as follows: When the front end portion 22 is mated with the adapter (not shown) so that the key projection 25 is received in the guide recess (not shown) of the adapter, then the first engagement portion 12 is engaged with the adapter. On the other hand, when the rear end portion 23 is mated with the plug (not shown) so that the key projection (not shown) of the plug is received in the guide recess 26, then the second engagement portion 18 is engaged with the plug. As the result, the plug is connected with the adapter through the optical attenuator 1.

However, the prior art optical connector components such as those including the optical attenuator 1 as described above are generally defective in that they need great number of parts and assembling steps, and involves many laborious works because of the sleeve 3 and the flange 8 made of metal. In addition, they are difficult to reduce the manufacturing cost.

Because an adhesive is used for affixing the connection sleeve 3 to the ferrule 2, any excessive amount of adhesive that has come out of the end of the connection sleeve 3 flows into between connection sleeve 3 and the split sleeve 4 or the flange 8, which may cause deterioration in precision of the length between the flange 8 and the split sleeve 4. Therefore, it is difficult to improve in precision of size and yield of the product in the prior art.

In view of the above an object of the present invention is to provide a ferrule holding structure that can reduce the number of parts and assembling steps, improve in precision of size and yield of the product, and reduce the manufacturing cost of the product.

SUMMARY OF THE INVENTION

To attain such object the present invention provides an optical connector component comprising a ferrule for receiving an end portion of a core optical fiber of a fiber optic cable, a flange mounted on the peripheral of the ferrule, and a one-piece plug frame for floatingly supporting the ferrule having the flange mounted thereon, in which the flange and the plug frame are provided with respective engagement portions that are mutually engaged, and in which the flange has such resiliency that it is reduced in diameter by a radial and inward force exerted through the engagement portions when the ferrule is inserted into the plug frame from one end thereof and the flange is restored to the original condition present before the insertion when the engagement portions are mutually engaged.

Preferably the flange is provided with an adhesive injection hole in the peripheral wall thereof and an enlarged diameter recess portion at one end thereof, and when an adhesive is injected into the adhesive injection hole after the flange is mounted on the ferrule, then the adhesive flows between the flange and the ferrule and reaches the enlarged diameter recess portion.

Furthermore, a clearance is produced between the flange and the ferrule, and when the ferrule having the flange mounted thereon is inserted into the plug frame from one end thereof, the flange is reduced in diameter due to the presence of the clearance. The flange is made of resin material.

Such construction of the present invention allows reduction in number of parts and assembling steps for the optical connector component, facilitated assembly works, improvement in precision of size, and reduction of manufacturing cost. In addition, there is substantially no possibility that an adhesive used for affixing the flange to the ferrule comes out of the end of the flange, which is effective to improve in precision of size and yield of the product.

BRIEF DESCRIPTION OF THE INVENTION

Now, the present invention will be described with reference to the accompanying drawings, in which.

DESCRIPTION OF THE PREFERRED EMBODIMENT

Figure 1:
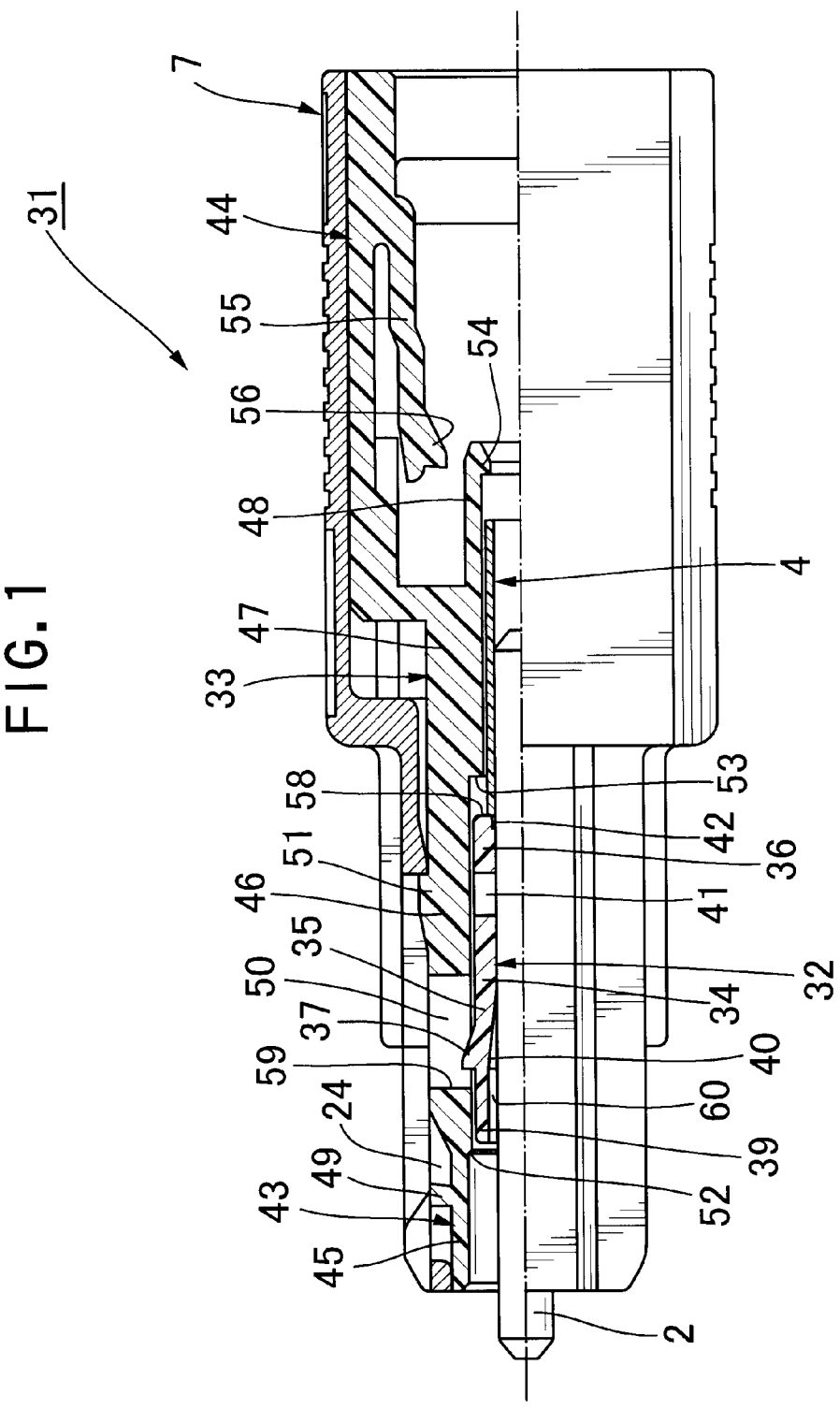
FIG. 1 is an enlarged view of an optical attenuator according to an embodiment of the present invention, illustrating an upper half of the attenuator in cross section.
Figure 2:
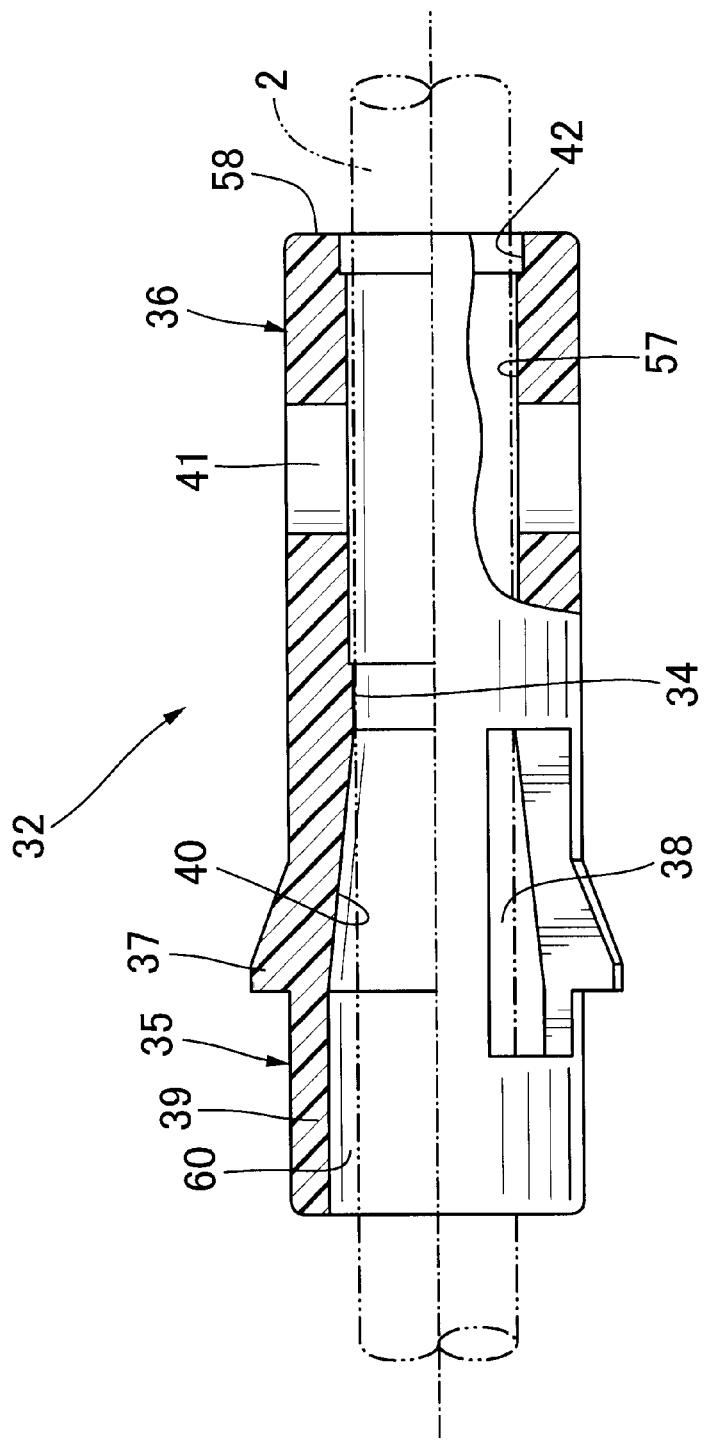
FIG. 2 is an enlarged view showing a flange according to the embodiment of the present invention partially in cross section.
Figure 3:
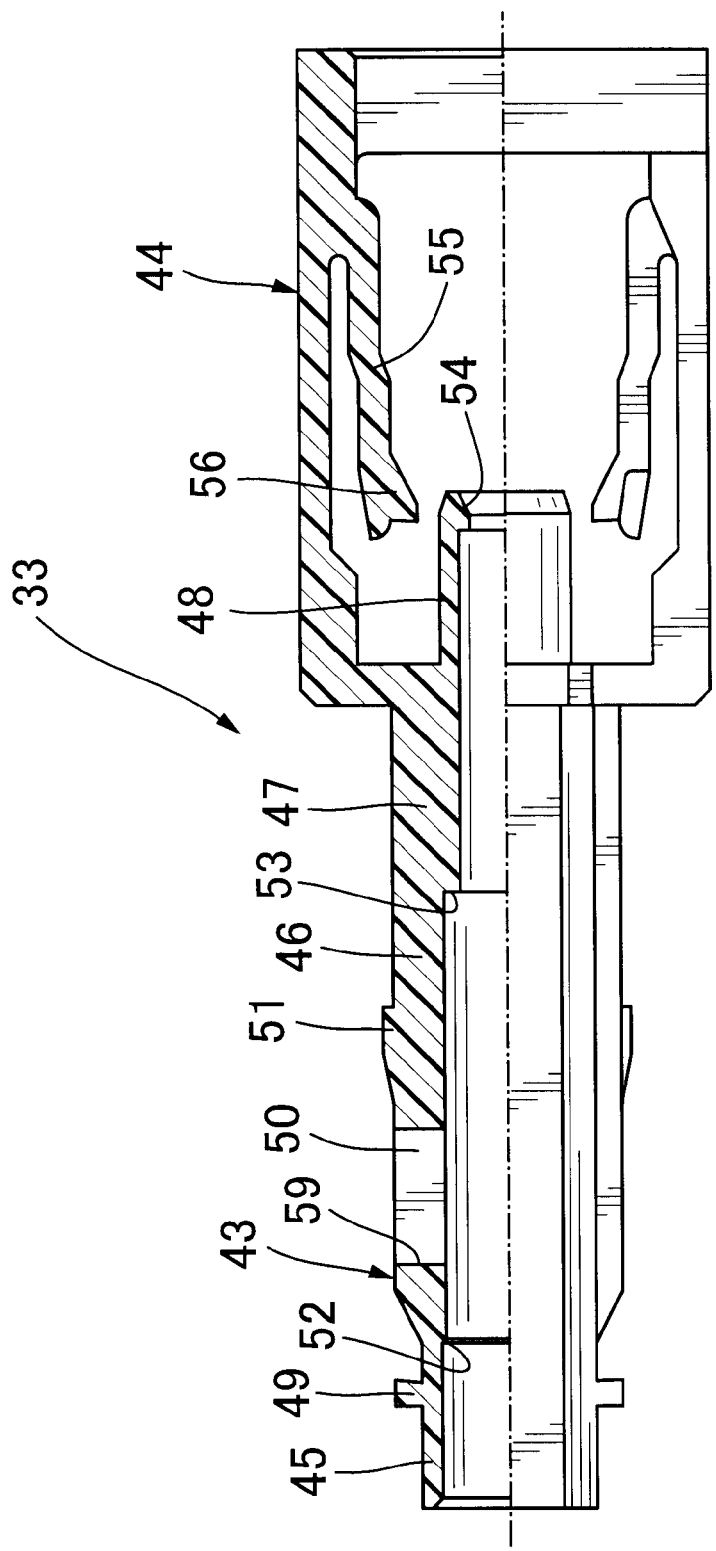
FIG. 3 is an enlarged view of a plug frame according to the embodiment of the present invention, illustrating an upper half of the plug frame in cross section.
Figure 4:
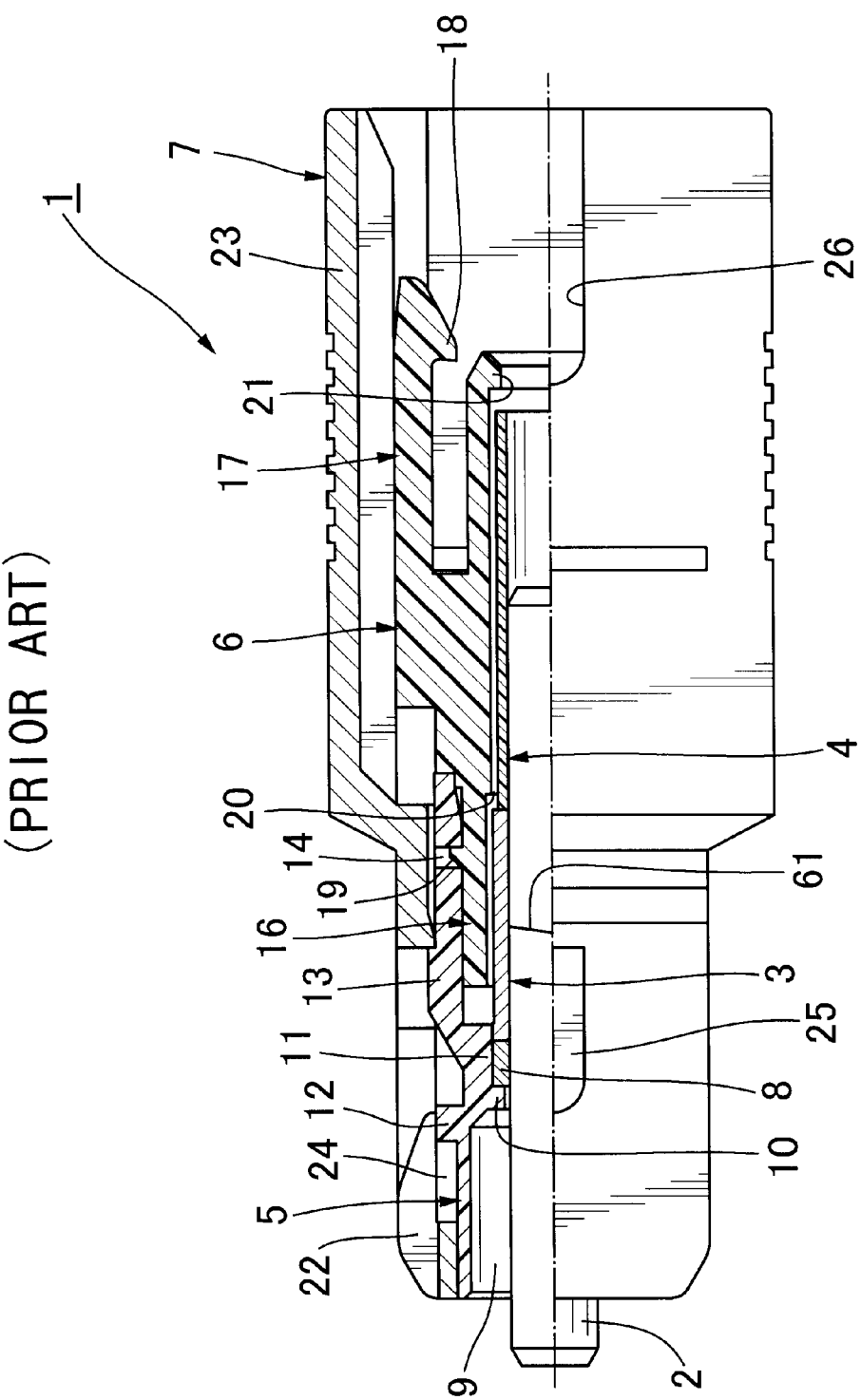
FIG. 4 is an enlarged view of an optical attenuator in the prior art, illustrating an upper half of the attenuator in cross section.

The present invention will be described in more detail with reference to FIGS. 1 to 3 illustrating an optical attenuator 31 constructed according an embodiment of the present invention. For the purpose of simplification, the parts corresponding to that of the prior art optical attenuator 1 are indicated by the same reference numbers and the description regarding such parts are omitted.

FIG. 1 is an enlarged view of an optical attenuator 31 according to an embodiment of the present invention, illustrating an upper half of the attenuator in cross section. The optical attenuator 31 includes a ferrule 2 having an attenuation film or an attenuation fiber provided thereon, a flange 32 affixed to an outer peripheral at the middle portion of the ferrule 2, a split sleeve 4, a plug frame 33 for supporting the ferrule 2 on which the flange 32 and the split sleeve 4 are affixed, and a housing member 7.

FIG. 2 is an enlarged view showing the flange 32 partially in cross section. The flange 32 is made of plastic material in the form of a cylinder having the wall thickness greater than that of the split sleeve 4. A press-fit portion 34 having the minimum inner diameter is formed in the middle portion of the flange 32. The ferrule 2 is press-fitted to this press-fit portion 34. The flange 32 further includes a deformable portion 35 positioned near the front end thereof and an adhesion portion 36 positioned near the rear end thereof The deformable portion 35 and the adhesion portion 36 have respective inner diameter greater than that of the outer diameter of the ferrule 2.

The deformable portion 35 has the predetermined number (two in FIG. 2) of engagement projections 37 formed on the outer surface thereof. Each of the engagement projections 37 has a tapered portion at the rear side. The deformable portion 35 further has the predetermined number (for example, four) of axial slits 38 formed in the peripheral wall thereof. The axial slit 38 is in the form of a triangle whose acute angled apex is pointed to rear side. A front end 39 of the deformable portion 35 has the maximum inner diameter so that there is a tapered surface 40 produced between the front end 39 and the press-fit portion 34. When the flange 32 is mounted to the ferrule 2, a clearance 60 is produced between the deformable portion 35 and the ferrule 2. The adhesion portion 36 has the predetermined number (two in FIG. 2) of circular adhesive injection holes 41 formed in the peripheral wall thereof. An enlarged diameter recess portion 42 is formed on an inner surface of the flange 32 at the rear end thereof When the flange 32 is mounted to the ferrule 2, a clearance 57 is produced between the adhesion portion 36 and the ferrule 2.

FIG. 3 is an enlarged view of the plug frame 33, illustrating an upper half of the plug frame in cross section. The plug frame 33 is made of plastic material, for example, and includes a cylindrical holding portion 43 in axial direction and a pair of resiliently deformable portions 44 that extend in cantilevered manner from the rear end portion of the holding portion 43 toward the rear side of the attenuator 31. The holding portion 43 is designed to floatingly hold the ferrule 2 having the flange 32 and the split sleeve 4 mounted thereon. The holding portion 43 is integral with the resiliently deformable portions 44.

The holding portion 43 is divided into the following sections depending on the wall thickness: a first thin wall section 45; a middle wall thickness section 46; a thick wall section 47; and a second thin wall section 48. A first engagement portion 49 is formed on the outer surface of the first thin wall section 45, a square engagement hole 50 is formed in the middle wall thickness section 46, and a protrusion 51 is formed on the outer surface near the engagement hole 50. The outer surface of the holding portion 43 between the first thin wall section 45 and the middle wall thickness section 46, and the front side of the protrusion 51 are outwardly slanted. The inner surface of the holding portion 43 is provided with a first shoulder portion 52 between the first thin wall section 45 and the middle wall thickness section 46, and a second shoulder portion 53 between the middle wall thickness section 46 and the thick wall section 47. The inner diameter of the holding portion 43 is reduced stepwise from the first thin wall section 45 toward rear side of the optical attenuator 31. An inwardly projecting fall-off prevention portion 54 is formed on the rear end of the second thin wall section 48. The fall-off prevention portion 54 has its inner diameter that is smaller than the outer diameter of the split sleeve 4, but greater than the outer diameter of the ferrule 2. The length between the second shoulder portion 53 and the fall-off prevention portion 54 is greater than that of the split sleeve 4. Each of the pair of resiliently deformable portions 44 includes a resilient arm 55 extending in cantilevered manner from the rear end portion of the deformable portion 44 toward the front side of the attenuator 31. The resilient arm 55 is provided with a second inwardly projecting engagement portion 56 at the front end thereof. Because the first engagement portion 49 and the second engagement portion 56 are formed on one and same plug frame 33, it becomes easy to control the length between the first engagement portion 49 and the second engagement portion 56 and to allow improvement in precision of the size.

Next, the process of assembling the optical attenuator 31 will be described in more detail.

The ferrule 2 is press-fit to the flange 32 and is held in the press-fit portion 34 of the flange 32. Then the predetermined amount of adhesive is injected via the adhesive injection hole 41 into the flange 32. The adhesive fills the clearance 57 and reaches the enlarged diameter recess portion 42. Because the enlarged diameter recess portion 42 has the inner diameter that is greater than that of the remaining portion of the adhesion portion 36, there is substantially no possibility that the adhesive that has reached the enlarged diameter recess portion 42 would leak to anywhere at the rear side thereof.

Thereafter, the ferrule 2 having the flange 32 mounted thereon is inserted into the split sleeve 4. The front end surface of the split sleeve 4 abuts the rear end surface of the flange 32 and the rear end portion of the split sleeve 4 backwardly projects beyond the rear end of the ferrule 2. Because of the wall thickness of the flange 32 greater than that of the split sleeve 4, a shoulder portion 58 is provided between the flange 32 and the split sleeve 4. Because of no possibility that the adhesive would be leaked from the rear end of the flange 32, as described above, the split sleeve 4 intimately abuts the flange 32 without any clearance therebetween. Accordingly the fixed length can always be assured between the front end surface of the flange 32 and the rear end surface of the split sleeve 4, which allows improvement in precision of size of the product.

Next, the ferrule 2 having the flange 32 and the split sleeve 4 mounted thereon is inserted into the holding portion 43 of the plug frame 33 from the front side thereof, as described earlier. The engagement projection 37 of the flange 32 has the tapered outer surface formed at the rear side thereof, and therefore, it is smoothly slid along the inner surface of the first thin wall section 45 of the plug frame 33 to apply a radial and inward force to the deformable portion 35. Because there is the clearance 60 present between the deformable portion 35 and the ferrule 2, and the predetermined number of the slits 38 formed in the flange 32, the deformable portion 38 is gradually reduced in diameter. As the ferrule 2 is further inserted into the holding portion 43, the engagement projection 37 abuts the inner surface of the middle wall thickness section 46, after passing through the first shoulder portion 52. Because the middle wall thickness section 46 has its inner diameter that is smaller than that of the first thin wall section 45, the deformable portion 35 is further reduced in diameter. Thereafter, the engagement projection 37 snaps into the engagement hole 50 and the deformable portion 35 restores the original condition where it was before insertion. Now, the ferrule 2 having the flange 32 and the split sleeve 4 mounted thereon is floatingly supported in the holding portion 43 of the plug frame 33. In this condition any movement of the ferrule 2 in the direction toward the front side is restricted due to the abutment between the front end surface of the engagement projection 37 and a front side surface 59 of the engagement hole 50. On the other hand, any movement of the ferrule 2 in the opposite direction toward the rear side is restricted due to the abutment between the shoulder portion 58 and the second shoulder portion 53 because of the length between the second shoulder portion 53 and the fall-off prevention means 54 greater than that of the split sleeve 4. Accordingly, in view of the fact that the front side surface 59 of the engagement hole 50 and the second shoulder portion 53 are formed on one and same plug frame 33, the length therebetween, or in other word, an extent of floating movement, can easily be controlled, and consequently, improvement in precision of size can be attained. Furthermore, there is substantially no possibility that the split sleeve 4 is broken or damaged when it is collided to the fall-off prevention means 54.

Next, the plug frame 33 having the ferrule 2 contained therein is inserted into the housing member 7 from the rear side thereof. The first engagement portion 49 and the protrusion 51 are received in the opening 24 so that the plug frame 33 is axially floatingly supported in the housing member 7.

In the embodiment as above, the optical attenuator has been described by way of an example. The present invention, however, is not limited to such optical attenuator, but may applied to any other optical connector components such as a filter, a terminator, etc.

The flange 32 and the plug frame 33 may include any other mutual engagement portion than that described above. For example, as opposed to the embodiment as described above, the engagement projection 37 may be formed on the plug frame 33 and the engagement hole 50 may be formed in the flange 32.

In addition, the present invention may be configured in such manner that the ferrule 2 having the flange 32 mounted thereon is inserted into the plug frame 33 from the rear side thereof. Alternatively the flange 32 may be formed in which the deformable portion 35 is positioned at the rear side to the press-fit portion 34 and the adhesion portion 36 is positioned at the front side to the press-fit portion 34.

It is apparent from the forgoing that a plug frame is configured as a one-piece component, a flange is made of resin material and has an engagement portion formed thereon, and a ferrule is held in the plug frame simply by inserting the ferrule having the flange mounted thereon into the plug frame from one side thereof. Therefore, it is possible to reduce the number of component parts and assembling steps, to simplify the assembling operations and to reduce the manufacturing cost.

Furthermore, because of an enlarged diameter recess portion formed at the end of the flange, there is substantially no possibility that an adhesive used for affixing the flange to the ferrule comes out of the end of the flange, which allows improvement in precision of size and yield of the product.

What is claimed is:

1. A ferrule holding structure of an optical connector component comprising a ferrule for receiving an end portion of a core optical fiber of a fiber optic cable, a flange mounted on the peripheral at a middle portion of the ferrule, and a one-piece plug frame for floatingly supporting the ferrule having the flange mounted thereon, a the ferrule holding structure comprising the flange and the plug frame, wherein:

each of the flange and the plug frame is provided with respective engagement portions, wherein the engagement portions of the flange and the engagement portions of the plug frame that are mutually engaged when the ferrule is fully inserted in the plug frame;

the flange has such resiliency that it is reduced in diameter by a radial and inward force exerted through the engagement portions of the flange as the ferrule is inserted into the plug frame from one end thereof and the flange is restored to the original condition present before the insertion when the respective engagement portions of the flange and the plug frame are mutually engaged: and the flange has an adhesion portion, a peripheral wall of the flange defining an adhesive injection hole therethrough in said adhesion portion, and said flange being sized to form a first clearance between the adhesion portion of the flange and the ferrule.

2. The ferrule holding structure according to claim 1 in which a second clearance is produced between the flange and the ferrule in an area proximate the engagement portions of the flange, and when the ferrule having the flange mounted thereon is inserted into the plug frame from one end thereof, the flange is reduced in diameter due to the presence of the second clearance.

3. The ferrule holding structure according to claim 2 in which the flange is made of resin material.

4. A ferrule holding structure of an optical connector component comprising a ferrule for receiving an end portion of a core optical fiber of a fiber optic cable, a flange mounted on the peripheral of the ferrule, and a one-piece plug frame for floatingly supporting the ferrule having the flange mounted thereon, the ferrule holding structure comprising the flange and the plug frame, wherein:

each of the flange and the plug frame is provided with respective engagement portions, wherein the engagement portions of the flange and the engagement portions of the plug frame are mutually engaged when the ferrule is fully inserted in the plug frame, the flange has such resiliency that it is reduced in diameter by a radial and inward force exerted through the engagement portions of the flange as the ferrule is inserted into the plug frame from one end thereof, and the flange is restored to the original condition present before the insertion when the respective engagement portions of the flange and the plug frame are mutually engaged, and the flange is provided with an adhesive injection hole in the peripheral wall thereof and an enlarged diameter recess portion at one end thereof, and when an adhesive is injected into the adhesive injection hole after the flange is mounted on the ferrule, then the adhesive flows between the flange and the ferrule and reaches the enlarged diameter recess portion.

5. The ferrule holding structure according to claim 4 in which a clearance is produced between the flange and the ferrule, and when the ferrule having the flange mounted thereon is inserted into the plug frame from one end thereof, the flange is reduced in diameter due to the presence of the clearance.

6. The ferrule holding structure according to claim 5 in which the flange is made of resin material.

* * * * *